(12) United States Patent
Greppi et al.

(10) Patent No.: US 7,552,805 B2
(45) Date of Patent: Jun. 30, 2009

(54) BRAKING DISC WITH IRREGULAR PROFILE AND BRAKE COMPRISING THIS DISC

(75) Inventors: Bruno Greppi, Erba CO (IT); Cesare Brioschi, Galbiate LC (IT)

(73) Assignee: Sunstar Logistic Singapore Pte. Ltd., Singapore (SG)

( * ) Notice: Subject to any disclaimer, the term of this patent is extended or adjusted under 35 U.S.C. 154(b) by 130 days.

(21) Appl. No.: 11/338,852

(22) Filed: Jan. 25, 2006

(65) Prior Publication Data

US 2006/0163015 A1    Jul. 27, 2006

(30) Foreign Application Priority Data

Jan. 25, 2005    (IT)    ............................ MI2005A0099

(51) Int. Cl.
*F16D 65/12*    (2006.01)
(52) U.S. Cl. .............................. 188/218 XL; 188/18 A
(58) Field of Classification Search ............... 188/18 A, 188/26, 218 XL, 264 R, 264 A, 264 AA, 188/73.36, 73.37, 250 E
See application file for complete search history.

(56) References Cited

U.S. PATENT DOCUMENTS

| | | | | |
|---|---|---|---|---|
| 2,835,355 A | | 5/1958 | Armstrong | .................. 188/218 |
| 3,298,476 A | * | 1/1967 | Day | ..................... 188/264 AA |
| 6,131,707 A | | 10/2000 | Buechel et al. | ............. 188/218 |
| 6,145,636 A | * | 11/2000 | Ikari et al. | ............ 188/218 XL |

FOREIGN PATENT DOCUMENTS

| | | |
|---|---|---|
| GB | 1114296 | 5/1968 |
| JP | 10-30664 | 3/1998 |

* cited by examiner

*Primary Examiner*—Thomas J Williams
(74) *Attorney, Agent, or Firm*—Jacobson Holman PLLC

(57) ABSTRACT

A braking disc of a brake of a wheel of vehicles is intended to be fixed to the wheel to be braked and comprises an annular braking track intended to cooperate with pads of the brake for performing braking of the wheel. Along an edge of the braking track of the disc there is present a plurality of notches; at least a notch has an angular distance from the successive adjacent notch that is different from the angular distance thereof from the preceding adjacent notch.

14 Claims, 2 Drawing Sheets

BRAKING DISC WITH IRREGULAR PROFILE AND BRAKE COMPRISING THIS DISC

BACKGROUND OF THE INVENTION

1. Field of the Invention

The present invention is related to a disc of the brake to be used in disc brakes intended for making wheels of vehicles brake, for example in the motorcycle field. More in general, the invention relates to a disc brake for wheels of vehicles.

2. State of the Prior Art

The problem of the noise of disc brakes has been known for some time, in particular in the field of motorcycles. The noise is due to rubbing of the disc against the brake pads, and in particular to the rubbing of the external periphery of the disc of the brake against the outermost part of the brake pad.

The systems adopted for solving the problem include proposing to make the external profile of the disc discontinuous, giving it an undulating shape such as to form concavities on the edge of the disc and to partially reduce the whistle produced.

Nevertheless, in discs of this type, the profile of the edge has a strongly periodic pattern with concavity spaced regularly along the periphery of the braking track. This feature comprises disc vibration problems, inasmuch as the markedly periodic stress imparted to the disc at a specific frequency by the braking action of the pad may generate mechanical resonance in the disc body. In fact, the resonance that is triggered (especially in discs of large dimensions provided with lightening) increases further the noise of the braking, without solving the original problem.

The general object of the present invention is to overcome the aforementioned drawbacks, providing a disc of the brake that enables the noise of the braking to be limited and phenomena of mechanical resonance of the disc to be prevented.

SUMMARY OF THE INVENTION

In view of this object, it has been decided to make, according to the invention, a braking disc of a brake of a wheel of vehicles intended to be fixed to the wheel to be braked and comprising an annular braking track intended to cooperate with pads of the brake for achieving braking of the wheel, along an edge of the braking track of the disc there being a plurality of notches, characterized in that at least a notch has an angular distance from the successive adjacent notch that is different from the angular distance thereof from the preceding adjacent notch.

BRIEF DESCRIPTION OF THE DRAWINGS

In order to make the innovative principles of the present invention and the advantages thereof over the prior art clearer, a possible embodiment will be disclosed below with the help of the attached drawings by way of non-limitative example. In the drawings.

DETAILED DESCRIPTION OF THE INVENTION

Figure 1:
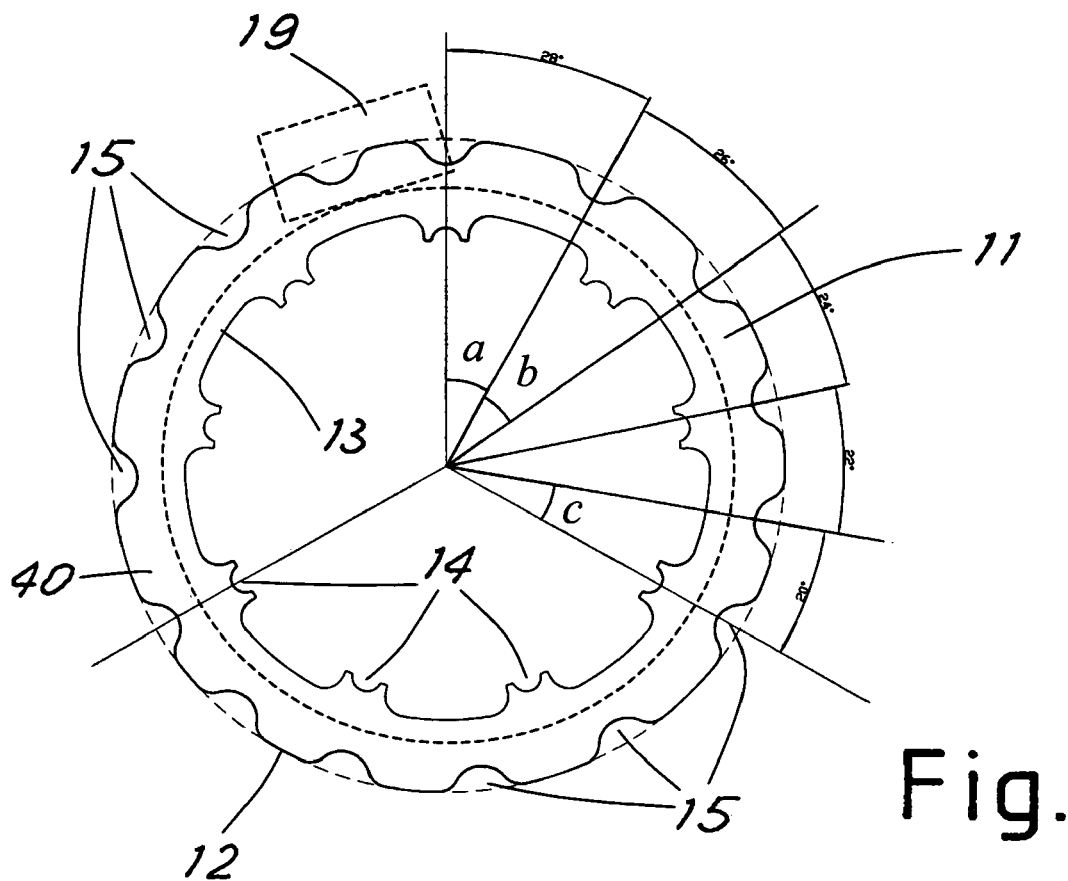
FIG. 1 shows an embodiment of a disc of the brake according to the invention.

With reference to the figures, in FIG. 1 a disc of the brake 11 is shown that is to be used in a disc brake for vehicle wheels, for example in the motorcycling field. The disc of the brake 11 is intended to be fixed to the wheel to be braked (not shown in the figure) and is suitable for cooperating with the friction surfaces of a pair of braking pads of the brake 19 (which are shown schematically with a broken line) to carry out the braking. In particular, the pads 19 act on an annular band of the disc that forms the braking track 40; advantageously, the pads 19 are positioned in relation to the disc in such a way that the track 40 is formed along the outer edge 12 of the disc 11.

The disc 11 has an annular shape that has an inner edge 13 on which there are seats 14 intended to receive known constraining elements (for example connecting rivets) that are necessary for fixing the disc to the hub of the wheel. There could be nine seats 14 and they could be spaced regularly along the internal perimeter of the disc according to what is shown in the figure.

On an edge of the braking track 40 a plurality of notches 15 is obtained. Advantageously, in the embodiment exemplified in FIG. 1, the notches 15 form a series of concavities along the outer edge of the annular braking track 40 of the disc and, in fact, are obtained on the outer edge 12 of the disc.

The notches 15, in addition to performing known lightening functions, contribute to decreasing the noise of the braking by making the rubbing of the outer edge 12 of the disc with the most external parts of the braking pads 19 discontinuous.

According to the invention, at least a notch 15 has an angular distance from the successive adjacent notch differing from the distance thereof from the preceding adjacent notch.

In the embodiment shown in FIG. 1, the notches 15 follow one another in such a way as to give the profile of the edge an aperiodic pattern according to the angle at the center of the disc along an angular interval equal to 120°. In the example illustrated in the figure, the aperiodic sequence of notches in an interval of 120° is repeated with a similar pattern in the two successive angular intervals of 120°.

The external profiles of the discs of the prior art had notches that were spaced regularly along the periphery with a highly periodic pattern so that, as already mentioned, mechanical resonance was generated on the disc. By making the pattern of the profile of the disc aperiodic, this phenomenon is neutralized, reducing mechanical resonance, the vibrations and therefore also the noise of the braking. The great aperiodicity of the pattern of the disc profile according to the invention in fact enables the frequency of the mechanical stress imposed on the disc by the brake pads to be varied and diversified, at the same motor vehicle speed. The different harmonic spectrum obtained thereby through the stress to the "disc" mechanical system prevents phenomena of resonance, as occurred by contrast with prior-art discs.

The notches 15, in an embodiment of the invention, have the same shape and the angular distances between pairs of adjacent notches 15 are all different from one another within an interval of 120°.

According to what is shown in the figure, a pair of adjacent notches may have an angular distance defined by the angle at the center "a" equal to 28°, the successive one by an angle at the center "b" equal to 26°, then 24° and 22°, until an angle "c" of 20° is reached. These five angular distances between pairs of notches occupy an interval of 120°. As already indicated, in the successive 120° interval the aperiodic sequence of angular distances is repeated in a similar way to the interval already disclosed.

Advantageously, between two adjacent notches the edge profile follows the circular pattern of the maximum circumference of the disc.

It should be noted that the notches 15 have a circle arc-shaped concavity.

Figure 2:
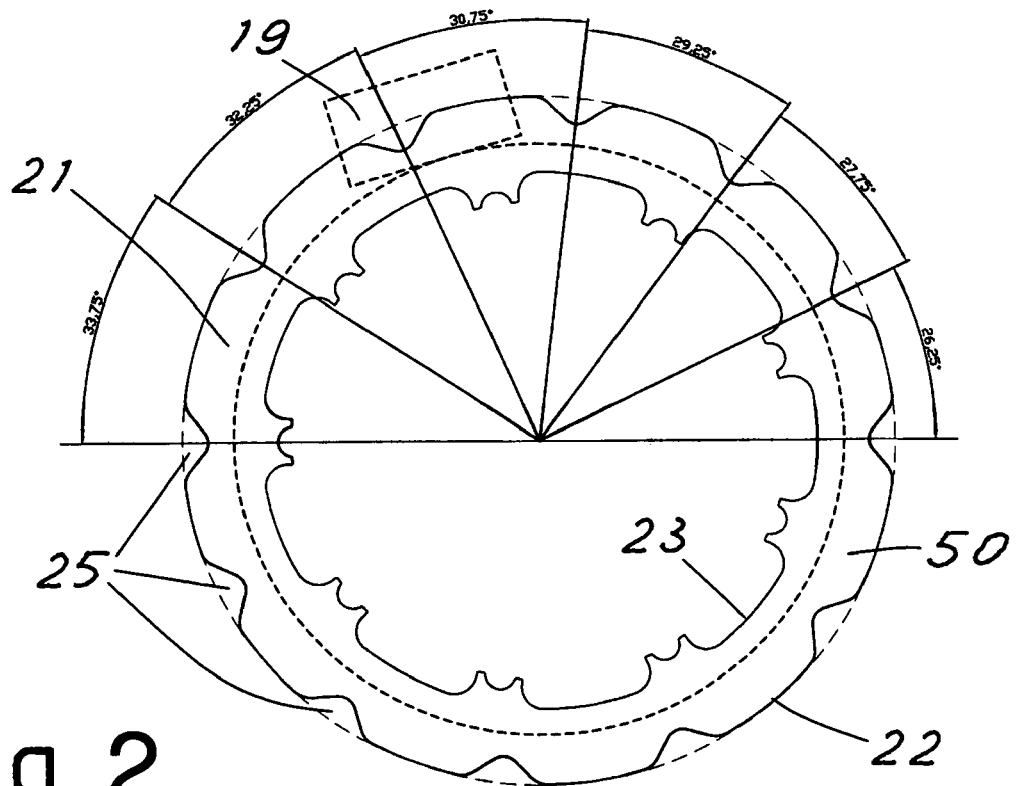
FIG. 2 shows a further embodiment of a disc according to the invention.

In the embodiment in FIG. 2, the disc 21 has a ring shape, similarly to the disc of the previous figure, with an inner edge 23 and an outer edge 22. The outer edge 22 of the disc (and of the braking track 50) has a sequence of notches 25 that are angularly-shaped, not circle arc-shaped as in the previous case.

According to what is shown in the figure, the notches follow one another in such a way as to give the outer edge of the disc an aperiodic pattern for an angular interval equal to 180°. In the successive interval of 180°, the pattern of the edge profile is repeated in a similar manner to that of the previous interval of 180°.

Traveling 180° clockwise, the distances between adjacent pairs of notches 25 are, in sequence, 33.75°, 32.25°, 30.75°, 29.25°, 27.75° and 26.25°.

Figure 3:
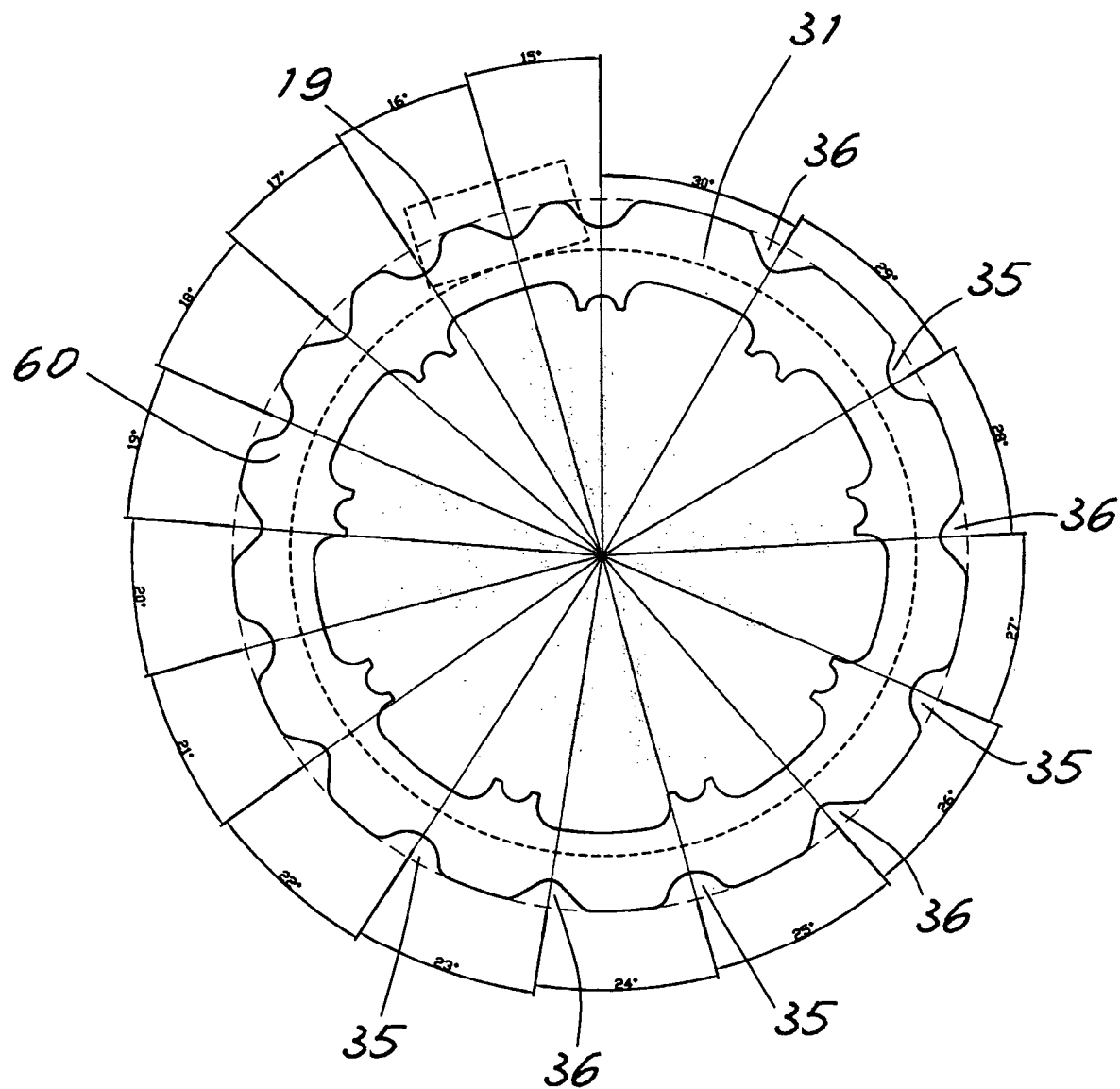
FIG. 3 shows a still other embodiment of a disc according to the invention.

FIG. 3 shows a further embodiment of the invention. The disc 31 has a series of notches 35 and 36 on an edge of the braking track 60 (obtained at the outer edge of the disc, similarly to the previous embodiments). The notches 35 have a circle arc shape and the notches 36 have an angle shape. The notches 35 and 36 alternate with one another along the perimeter of the disc.

In this case, all the adjacent pairs of notches have distances that are different from one another, so that the pattern of the profile of the outer edge of the disc is aperiodic along an interval of 360° (in other words, there is no periodicity along any of the edge). The angular distances between pairs of adjacent notches decrease, traveling clockwise around the disc from 30°, to 29°, to 28° and so on to 15°.

It should be noted that, advantageously, a notch on the edge of the disc has a size that makes an angle at the center comprised between 10° and 40°, preferably equal to about 15°. The angular distance between adjacent notches, advantageously, could be comprised between a minimum of 10° and a maximum of 60°.

At this point it is clear how the objects of the present invention have been achieved. A disc of the brake has in fact been provided that enables the noise of braking and the mechanical resonance of the disc during braking to be limited. Furthermore, the presence of the notches enables the disc to absorb in an optimal manner the thermal stresses due to braking, thereby avoiding deformation of the axial direction in relation to the disc.

Naturally, the above disclosure of an embodiment applying the innovative principles of the present invention is provided by way of example of the innovative principles, and must not therefore be deemed to limit the scope of the invention claimed herein.

For example, the notches could have different shapes from those disclosed.

The disc could also be fixed to the wheel to be braked along its external periphery and the braking track could be obtained on the inner edge of the disc. In this case, the notches could be obtained on the inner edge of the braking track.

What is claimed is:

1. A braking disc of a brake of a wheel of vehicles intended to be fixed to the wheel to be braked, said braking disc comprising
   an annular braking track cooperating with pads of the brake for performing braking of the wheel,
   a plurality of notches located along an edge of the braking track with at least a notch having an angular distance from a successive adjacent notch different from an angular distance thereof from a preceding adjacent notch and with an angular variation between successive adjacent notches being equal, and
   a maximum angular distance between two adjacent notches being 60°, and
   a sequence of notches spaced apart at irregular intervals being repeated periodically at least two times along said edge at a regular interval defined by a center angle of one of 120° and 180°.

2. The braking disc according to claim 1, wherein the notches are obtained on an external edge of the disc.

3. The braking disc according to claim 2, wherein between two successive notches a profile of the edge of the disc follows a pattern of a maximum circumference of the disc.

4. The braking disc according to claim 1, wherein said notches have a same shape.

5. The braking disc according to claim 1, wherein the angular distances between two successive notches are all different from one another as selected notches vary.

6. The braking disc according to claim 1, wherein a minimum angular distance between two successive notches is 10°.

7. The braking disc according to claim 1, wherein each notch has a size that has an angle at a center that is greater than 10°.

8. The braking disc according to claim 1, wherein each notch has an angle size at a center that is less than 40°.

9. The braking disc according to claim 1, wherein a distance between two adjacent notches is a monotonous function of an angle at a center of the disc.

10. The braking disc according to claim 1, wherein a notch has a circle-arc shape.

11. The braking disc according to claim 1, wherein a notch has an angular shape.

12. The braking disc according to claim 10, wherein the notch has an angular shape and notches shaped as circle arcs and notches shaped at an angle alternate with one another along a profile of the edge of the braking track.

13. The braking disc according to claim 1, wherein the braking disc has an annular shape and along an internal edge is connecting means for connecting to a hub of the wheel to be braked.

14. The disc brake for wheels of vehicles comprising a braking disc coupled with the wheel to be braked and pads suitable for acting on an annular braking track of the disc to achieve braking, wherein the disc is the disc according to claim 1.

* * * * *